G. T. OTTE.
AUTOMOBILE STEERING WHEEL.
APPLICATION FILED APR. 16, 1917.

1,239,948.

Patented Sept. 11, 1917.
2 SHEETS—SHEET 1.

WITNESSES

INVENTOR
G. T. Otte
BY
ATTORNEYS

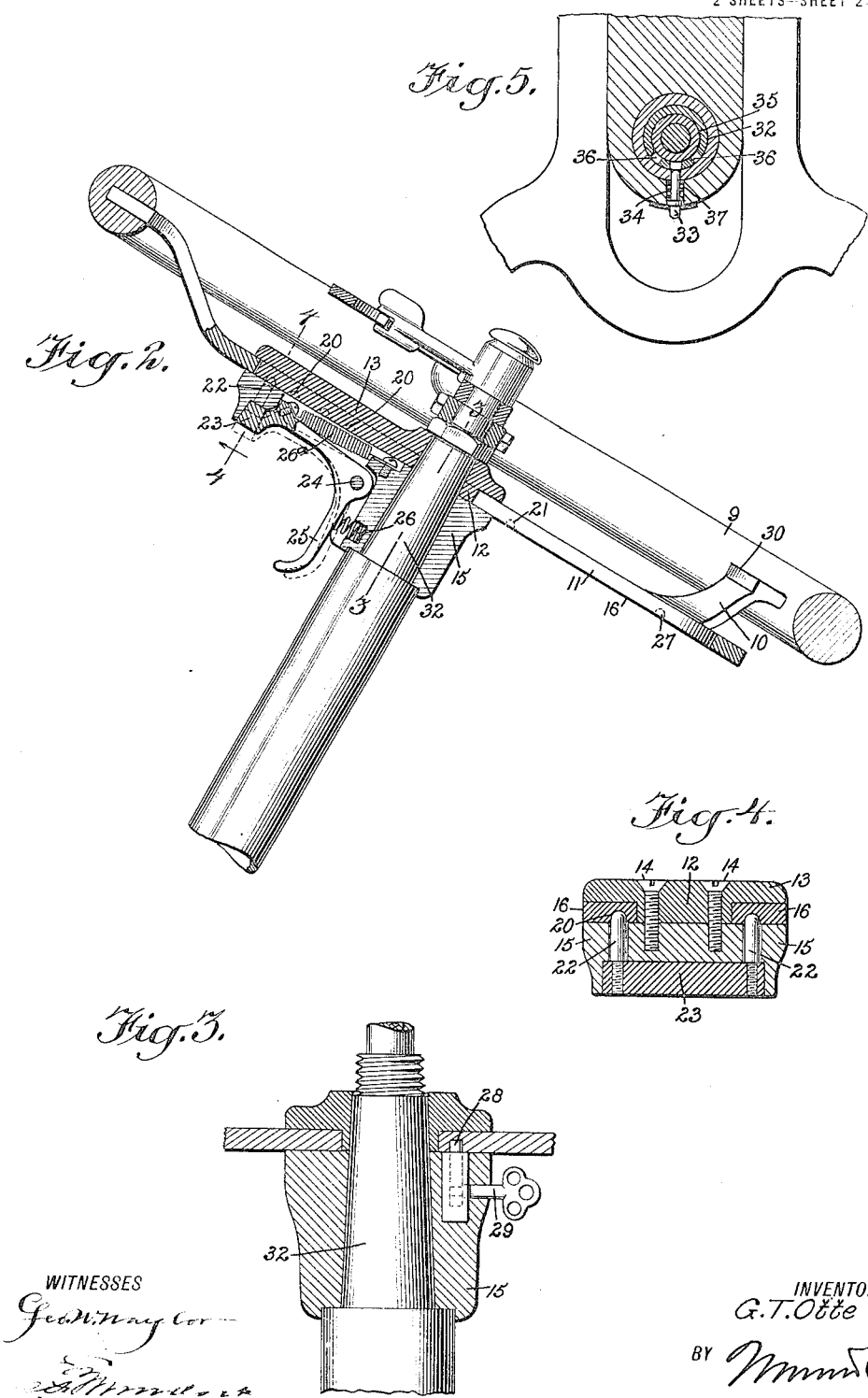

UNITED STATES PATENT OFFICE.

GEORGE T. OTTE, OF GREENWICH, CONNECTICUT.

AUTOMOBILE STEERING-WHEEL.

1,239,948.             Specification of Letters Patent.      Patented Sept. 11, 1917.

Application filed April 16, 1917. Serial No. 162,326.

*To all whom it may concern:*

Be it known that I, GEORGE T. OTTE, a citizen of the United States, and a resident of Greenwich, in the county of Fairfield and State of Connecticut, have invented a new and Improved Automobile Steering-Wheel, of which the following is a full, clear, and exact description.

Among the principal objects which the present invention has in view are: to change the location of the steering wheel without discontinuing the working condition thereof; to adjust the working position of the wheel; and to lock the wheel and steering mechanism connected therewith for preventing the operation of the automobile on which the wheel is mounted.

Drawings.

Fig. 2 is a longitudinal section of the same, the section being taken as on the line 2—2 in Fig. 1;

Fig. 3 is a vertical section on an enlarged scale of the head of the tiller post, the section being taken as on the line 3—3 in Fig. 2;

Fig. 4 is a cross section on an enlarged scale, the section being taken as on the line 4—4 in Fig. 2;

Fig. 5 is a cross section on an enlarged scale showing a modified form of the mechanism for locking the wheel and steering mechanism connected therewith inactively.

Figure 1:
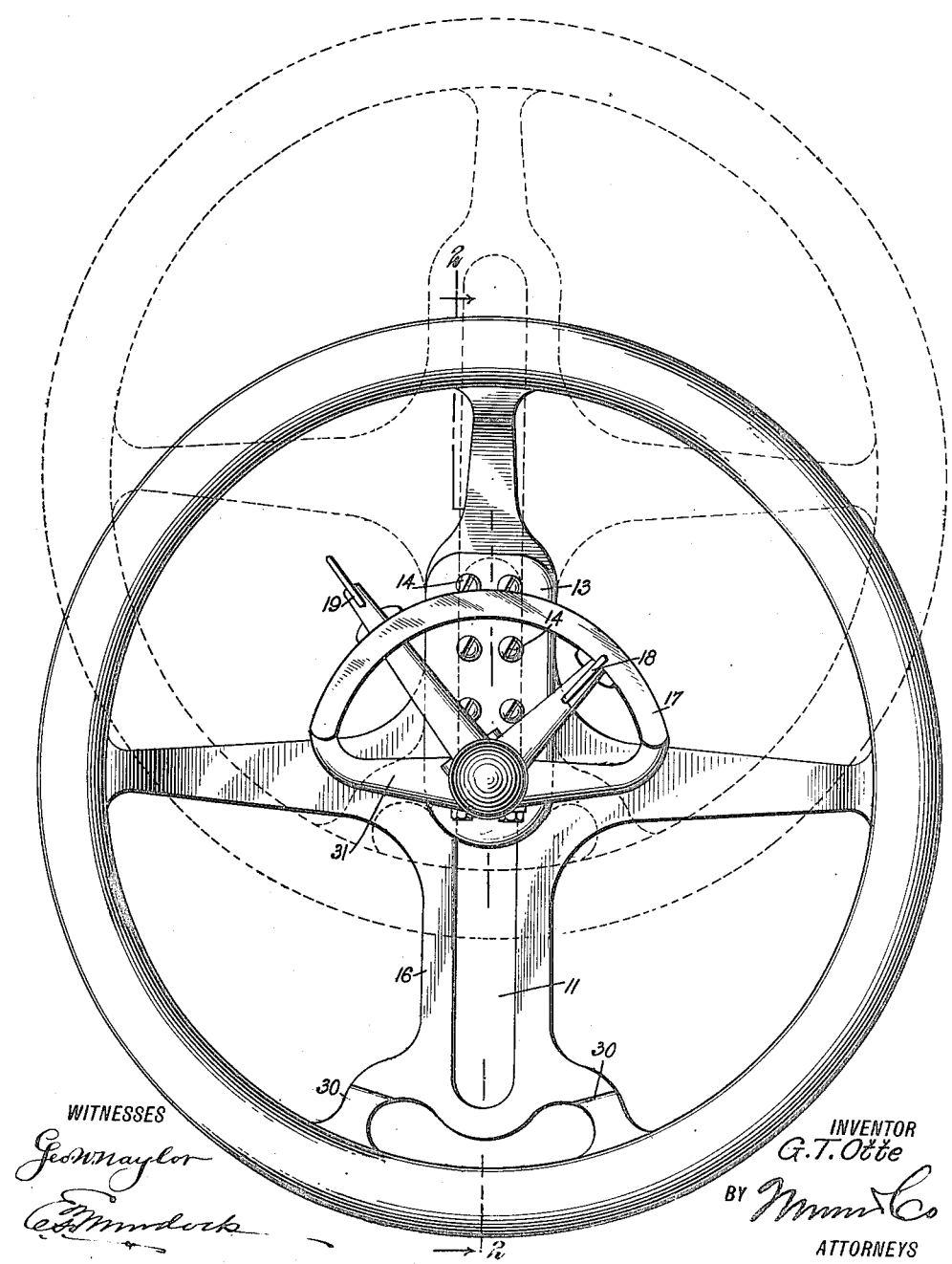
Figure 1 is a top plan view of a wheel constructed and arranged in accordance with the present invention, the same being shown in conjunction with an operating post and driving controlling mechanism mounted thereon.

Description.

As seen in the drawings, a wheel when constructed in accordance with the present invention has a gripping rim 9 rigidly mounted upon and concentric to a spider 10. The spider 10 is constructed from a single piece having lengthwise thereof a guide slot 11. The guide slot 11 coöperates with a boss 12 pendent from the under side of a hub plate 13. The plate 13 is rigidly attached by means of screws 14 or other suitable fastenings, to the hub body 15. The edges of the boss 12 are inset from the edges of the plate 13 and the body 15, the flanges whereof in conjunction with the boss 12, form snug-fitting guides for the spider 10 and flat plate member 16 thereof. The connection between the boss 12, the plate 13, and hub body 15, is such as to permit smooth shifting of the wheel lengthwise of the slot 11, which slot is elongated to allow the maximum movement of the wheel with reference to the boss 12, and away from the seat of the driver of the automobile. This position is shown by dotted lines in Fig. 1 of the drawings.

When it is desired, the plate 16 and the slot 11 therein may be extended in a forward direction to permit a corresponding retraction of the wheel toward the seat of the driver.

The movement of the wheel in both directions is controlled in a large measure by the construction and disposition of the control quadrant 17 and the operating levers 18 and 19.

To hold the wheel in adjusted position, a series of indents 20 and 21 are formed in the plate 16. Said indents are provided to receive pins 22. The pins 22 are permanently mounted in the end of a trigger latch lever 22. The lever 23 is pivotally mounted by pins 24, as shown best in Fig. 2 of the drawings, in the hub body 15, and preferably at the forward side thereof. Integrally connected with the lever 23, is a trigger grip 25. The lever 23 is normally raised to insert the ends of the pins 22 in the indents 20, when said indents are alined with said pins.

By the coöperation of a compression spring 26 and a pull spring $26^a$, the spring $26^a$ is anchored to the hub body 15 and to the forward end of the lever 23, the axis of said spring being above and out of line with the pin 24. The spring 26, as seen in Fig. 2 of the drawings, is disposed in a socket formed in the body 15, and bears against the inner side of the trigger grip 25.

The wheel may be locked when in the extreme forward position as shown by dotted lines in Fig. 1. For this purpose, an indent 27 is provided in one of the sides of the plate 16. The indent is provided to receive the end of a bolt 28, when said bolt is moved by the operation of a key 29 thereinto.

When the wheel is locked in the position shown by dotted lines in Fig. 1 of the drawings, the shoulders 30 on the spider and at the end of the plate 16 thereof impinge upon the cross bar 31 of the quadrant construction. The quadrant construction being stationary, it is impossible to move the wheel without destroying the quadrant, until the bolt 29 is withdrawn from the indent 27, the wheel and the steering mechanism connected therewith remain inactively disposed.

Operation.

When normally and inactively disposed, the wheel is arranged as shown by full lines in Fig. 1 of the drawings, with the rim 9 concentric to the tiller post 32. When the driver desires to leave the car, the wheel is shifted to the position shown by dotted lines in said figure. Under normal conditions by shifting the wheel in the manner disclosed, the rim is removed from proximity to the driver, giving additional room for movement of the driver on leaving the car.

To shift the wheel in the manner described, the driver engages the trigger grip 25 to draw the same to the position shown by dotted lines in Fig. 2 of the drawings. This rocks the latch lever 23 to the position shown by dotted lines in said figure, where the pins 22 are withdrawn from engagement with the indents 20. While the latch lever 23 is thus held, the wheel is free to slide on the plate 16. When the rear end of the slot 11 engages the rear end of the boss 12, it will be found that the indents 21 are in line with the pins 22. The trigger grip 25 is then released to permit the springs 26 and 26ª to lift the pin-bearing end of the lever 23 to engage the pins 22 with the indents 21. This is the extreme forward position of the wheel.

If at any time while operating the car, the driver wishes to change the position of the wheel to rest his arms or for any other reason, the pins 22 are withdrawn from the indents at the extreme positions of the wheel, which is then moved to a position where the same pins will engage one or more of the intermediate indents 20 to hold the wheel in greater or lesser extended position.

Whether the wheel be disposed eccentric to the tiller post 32 or not, it may be employed for turning the same and for steering the automobile.

On leaving the automobile, the driver may lock the steering mechanism by shifting the wheel to the extreme outer position as shown by dotted lines in Fig. 1, and by placing the key 29 in the key-hole provided for it in the body 15, to lift the bolt 28, which enters the indent 27 and prevents the subsequent movement of the wheel. The wheel and the tiller post 32 connected therewith are held from rotating by the shoulders 30 thereon engaging the cross bar 31 of the quadrant 17. The quadrant being immovable, the wheel is held from turning until the driver inserts the key 29 and turns the same to lower the bolt 28 from engagement with the indent 27. This being done, the wheel is free to be moved when the latch lever 23 is depressed.

In the modified form of the lock shown in Fig. 5 of the drawings, the shoulders 30 are dispensed with and in lieu thereof a pin 33 is employed. The pin 33 is housed in a boring 34 in the boss 12 and at the rear thereof. The inner end of the pin 33 passes through a corresponding boring in the tiller post 32. The quadrant sleeve 35 has a series of perforations 36, each adapted to receive the end of the pin 33. The pin 33 is normally disposed as shown in Fig. 5 of the drawings, being there held by the spring 37 so that the outer end of the said pin is directly in the path of the rear end of the member 16.

In operation and when using the modified form the steering wheel may be manipulated to turn the front wheels of the automobile so as to engage the curbing stone adjacent which the automobile is stopped. The pin 33 is moved until in line with one of the perforations 36. Before leaving the car, the wheel is shifted forward to a position where the rear end of the plate 16 engages the pin 33 and forces the same into one of the perforations 36. When now the bolt 28 is moved by the key 29 to engage the plate 16, it will be found that the wheel is immovable and the pin 33 is held in locking relation to the quadrant sleeve 35.

Claims.

1. A wheel as characterized comprising a rim; a spider support for said rim, said support having a straight slide extending in a plane parallel to the median plane of said rim; a hub portion slidably mounted on said spider support; a trigger-operated latch for engaging said spider support for holding said rim in operating positions eccentric to said rim; a fixed automobile-operating quadrant non-rotatively mounted concentric to said hub portion and adapted for engaging said spider support when the wheel is disposed in advanced position; and means for locking the wheel in said advanced position.

2. A wheel as characterized comprising a rim; a spider support for said rim, said support having a straight slide extending in a plane parallel to the median plane of said rim; a hub portion slidably mounted on said spider support; a trigger-operated latch for engaging said spider support for holding said rim in operating positions eccentric to said rim; a fixed automobile-operating quadrant non-rotatively mounted concentric to said hub portion and adapted for engaging said spider support when the wheel is disposed in advanced position; and means for locking the wheel in said advanced position, said means embodying a key-operated lock mounted in said hub portion and having a bolt for engaging said spider support.

GEORGE T. OTTE.